W. FINKLE.
Millstone Dress.
No. 11,216.  Patented July 4, 1854.
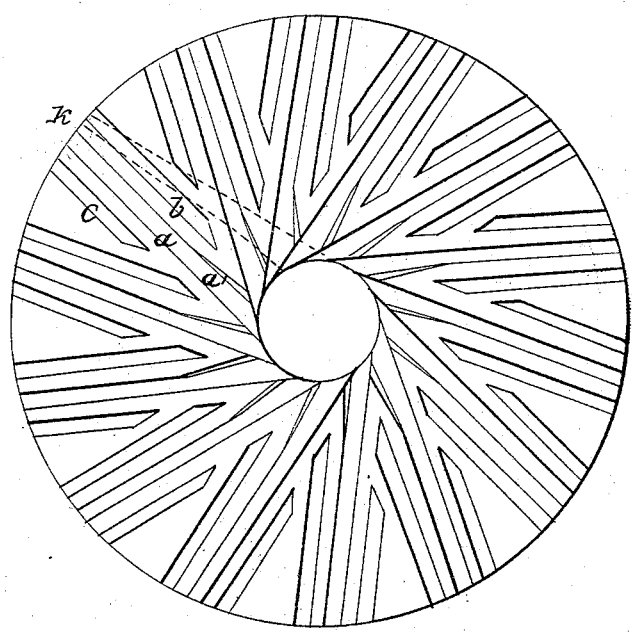

UNITED STATES PATENT OFFICE.

WILLIAM FINKLE, OF COLE CREEK, INDIANA.

MILLSTONE-DRESS.

Specification of Letters Patent No. 11,216, dated July 4, 1854.

*To all whom it may concern:*

Be it known that I, WM. FINKLE, of Cole Creek, Fountain county, Indiana, have invented new and useful Improvements in the Method of Dressing Millstones; and I do hereby declare the following to be a full, clear, and exact description thereof, reference being had to the annexed drawings, making part of this specification, and in which a face view is given of the "turner."

The chief objects of my invention are: the easy access of "food" and air between the stones; the concentration of the grinding duty toward the eye, where there is the most power, and the least liability to cant the stone and scorch or "kill" the flour; the rapid grinding and slow discharge near the eye, and the moderate grinding and brisk discharge toward the skirt, where the meal is liable, if detained, to accumulate and become "killed," so as to render it unfit for the purposes of the baker; the thorough and even grinding of all the food so as to avoid the discharge of "cuttins," &c. These objects I accomplish by a peculiar arrangement of the skirt furrow herein particularly described, and which I recommend to be employed with the following arrangement of the leading and other furrows.

Firstly. I flare or widen the leading furrows (*a*) toward the eye, by bending back the "feathered" or rear edge (*a'*) of the furrow, so as that it touches or near touches the front edge of the succeeding "leader," and thus, bringing this deflected portion in a nearly radial direction, and I also slightly depress the bottom of the furrow entrance on the feathered side. Several advantages result from this form of furrow entrance: The food, which is somewhat slow to enter between the stones, in consequence of their comparatively slow motion at the eye, is by this arrangement drawn into the furrow, and that in such quantity as to subject it at once to an active grinding action. This grinding action is still further accelerated by the improved sheer cut of the deflected edges of the bedstone and runner as they act against each other. The funnel shape thus given to the furrow entrance also facilitates the admission of air between the stones. The relative positions of the feathered edges of the bed stone are indicated by dotted lines (*k*).

The imperfect gathering of the food by stones now in use is evidenced by the frequent resort to what is called a "bosom," which is a depression of the face of the runner for some distance around the eyes.

Secondly. I entirely isolate from each other all the furrows; the result of which is that the meal, having to traverse "land" to reach the second furrow, and again in passing from that to the skirt furrow, becomes more thoroughly ground. One beneficial consequence of this intervention of land between the furrows is that the faces of the stones can be set farther apart and thus the risk of killing the meal be diminished. With the usual dress almost all the grinding duty devolves on the skirt.

Thirdly. Instead of making the second or intermediate furrows (*b*) parallel to the preceeding leaders, I make them parallel to their own leaders, and thereby, by diminishing their "draft" (or amount of deflection from a radial line), I retard the discharge and prolong the grinding action at this point.

Fourthly. I make the "skirt furrows" (*c*) parallel with the succeeding leaders, in order, by increasing the draft at this part, to facilitate the discharge of the meal as quickly as it is ground and thus to avoid killing it.

I have found that a four feet run of stones dressed on this plane will readily grind 12 bushels of wheat per hour, and with a yield of 1 lb. more flour to the bushel than with the usual dress.

I claim herein as new and of my invention, and desire to secure by Letters Patent—

The skirt furrow, isolated both from the leading and from the intermediate furrow or furrows for the objects before stated; but parallel to the succeeding leader, in order to facilitate the delivery of the meal as it is ground either in connection or otherwise with the flared and deepened entrances of the leading furrows as described.

In testimony whereof I hereunto set my hand before two subscribing witnesses.

WILLIAM FINKLE.

Witnesses:
 GEO. H. KNIGHT,
 B. H. GETZENDANNER.